United States Patent Office 3,489,286
Patented Jan. 13, 1970

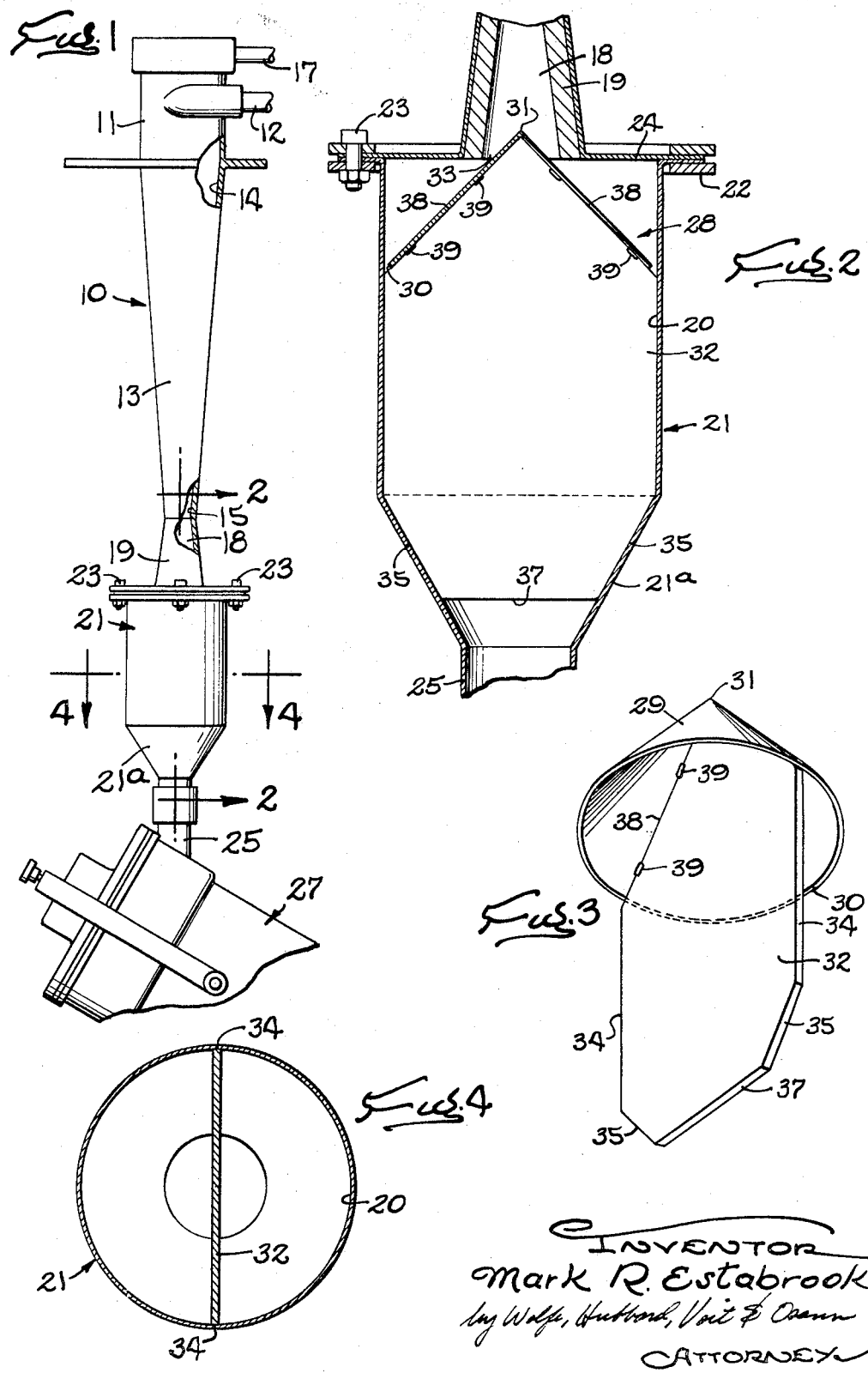

3,489,286
HYDROCYCLONE SEPARATOR WITH PARTICLE TRAP
Mark R. Estabrook, Rockford, Ill., assignor to Barnes Drill Co., Rockford, Ill., a corporation of Illinois
Filed July 1, 1968, Ser. No. 741,398
Int. Cl. B04c 3/00
U.S. Cl. 210—512                                   6 Claims

ABSTRACT OF THE DISCLOSURE

A hydrocyclone separator having a cylindrical inlet, a conical treating chamber, an inverted outlet cone, and a cylindrical underflow chamber through which separated solids pass to an underflow pot. Fitted in the underflow chamber is a trap unit having a conical upper end member with a circular peripheral edge spaced inwardly from the chamber wall to form a narrow peripheral gap through which solids and liquid may enter the chamber, and extending downwardly from the conical member is a baffle plate which divides the chamber longitudinally in half to break swirling of liquid along the wall and also to support the conical member. The peak of the latter is centered on and slightly above the end of the outlet cone.

BACKGROUND OF THE INVENTION

This invention relates to the separation of solid particles from fluid in a so-called hydrocyclone separator of the type having a conical treating chamber into which dirty fluid is directed under pressure, adjacent the larger end of the chamber, to create a vortical flow along the conical wall toward an outlet opening at the smaller end of the chamber. In a well-known manner such a separator produces a reverse flow of clean fluid along the axis of the chamber for withdrawal at the larger end and a swirling flow of solid particles and accompanying fluid through the outlet opening. Beyond the outlet opening is an underflow chamber, usually circular in cross-section, where the solids settle out of the swirling fluid for removal from the separator.

One example of a known hydrocyclone of this general type is shown in Patent No. 3,235,090. Separators of this type of various uses which include the cleaning of drycleaning fluid for reuse and the removal from machine tool coolants of solid particles which are picked up during circulation of the coolant through a using system. Of course, in any cleaning operation the object is to remove as much contamination as possible and thereby deliver the fluid output for use in optimum condition.

SUMMARY OF THE INVENTION

The general object of the present invention is to improve the operation of hydrocyclone separators by minimizing the amount of solid particles, even in minute sizes, that are picked up by the swirling fluid adjacent the outlet and introduced into the clean output flow from the hydrocyclone. A more detailed object is to trap solids discharged from the outlet and isolate these solids as rapidly as possible from the swirling liquid flow, in order to guard against re-entrainment of particles in the output flow which begins adjacent or beyond the outlet. Still another object is to reduce swirling in the underflow chamber and hereby reduce disturbance of the trapped solids, for less likelihood of movement back past the trap and more rapid settling out for final removal.

Other objects and advantages of the invention will become aparent from the following detailed description, taken in conjunction with the accompanying drawings.

BRIEF DESCRIPTION OF THE DRAWINGS

FIGURE 1 is a fragmentary side elevation of a hydrocyclone separator, including the underflow chamber and collection pot for final separation of solids, the hydrocyclone being partly broken away and shown in cross-section.

FIG. 2 is an enlarged fragmentary cross-sectional view taken substantially along the line 2—2 of FIG. 1 and showing a trap embodying the novel features of the present invention.

FIG. 3 is a perspective view of the trap.

FIG. 4 is an enlarged cross-sectional view taken substantially along the line 4—4 of FIG. 1.

DETAILED DESCRIPTION

As shown in the drawings for purposes of illustration, the invention is combined with a hydrocyclone separator 10 (FIG. 1) of a basically well-known type having a cyclindrical upper or inlet end portion 11 into which dirty fluid is injected tangentially through an inlet pipe 12, a body 13 having an internal conical wall 14 defining the treating chamber in which the inlet flow creates a vortical flow around the wall and downwardly toward the smaller end of the chamber, and an outlet opening 15 at the smaller end passing separated solids out of the treating chamber for collection and removal. The vortical flow in the separator along the conical wall results in an inner, and reverse, vortical flow upwardly along the axis of the cone toward the larger end where the clean fluid passes out of the separator through an outlet pipe 17.

For many applications, the outlet opening 15 preferably opens into an inverted conical chamber 18 (FIG. 2) in a subcone 19 on the smaller end of the body 13, where the cross-section area of the fluid passage increases progressively beyond the opening. Herein, this opening is referred to as "the outlet opening," the chamber 18 as "the outlet con," and the two together sometimes as "the outlet."

The underflow of fluid and particles separated from the output flow from the treating chamber 14 passes with a swirling motion through the outlet cone 18 and into an underflow chamber 20, herein the interior of a cylinder 21 having a flange 22 around its open upper end bolted and sealed at 23 to a flange 24 around the lower end of the subcone 19, and also having a conically tapered lower end portion 21ª leading to an underflow pipe 25 opening into a pot 27 for collecting the particles and straining the underflow. From the pot, strained underflow fluid preferably is returned to the using system for recycling through the hydrocyclone 10.

In accordance with the present invention, a novel trap unit 28 is disposed in the underflow chamber 20 to isolate solid particles as rapidly and completely as possible from the swirling fluid in and beyond the outlet while avoiding interference with the normal vortical flow in the outlet, thereby to minimize re-entrainment of such particles, and particularly particles in very small sizes that are more susceptable to re-entrainment. In addition, the trap unit breaks the swirling flow and reduces turbulence in the underflow chamber for more rapid settling out of solid particles and removal of the latter from the portion of the chamber where re-entrainment is possible.

To these ends, the trap unit 28 comprises a trap member 29 fitted in the upper end portion of the underflow chamber 20 and formed with a peripheral edge 30 cooperating with the peripheral wall of the chamber to define a narrow peripheral gap through which solids and liquid may pass around the trap member. Moreover, the central portion of the member is raised above the level of the peripheral edge to a peak 31 in the preferred form, and the surface of the member facing toward the outlet is inclined outwardly in all directions and downwardly from the peak to the gap to promote movement of solids off the member, to and through the gap. To break swirling motion and reduce turbulence beyond the trap member, the unit includes a baffle 32 dividing the underflow chamber longitudinally, generally in half, thereby preventing swirling of fluid beyond the trap member around the peripheral wall of the chamber.

In this instance, the trap member 29 is a cone-shaped sheet metal or plastic wall having an outside diameter at the edge 30 less than the inside diameter of the chamber 20 by an amount equal to twice the width of the gap. The peak 31 preferably is a clean point, but may be rounded off, if desired, to avoid edges, burrs or the like that might interfere with the normal flow of fluid around the conical wall. For optimum performance, the peak is disposed slightly inside the larger end of the outlet cone 18 and cooperates with the latter to define an annular opening at 33 (FIG. 2) around the central portion of the trap cone for passage of the swirling fluid and solid particles out of the outlet cone.

The illustrative trap cone 29 is sheet metal and is installed in an underflow chamber 20 having a diameter between five and six inches, projects approximately one-half inch into the outlet cone 18, and has a ⅛-inch-wide encircling gap and a cone angle on the order of forty-five degrees. While these dimensions are in no way limiting, they are given to illustrate one suitable specific arrangement.

Extending downwardly from the trap cone 29 is the baffle 32 which herein is a flat sheet metal plate having side edges 34 fitted closely within the underflow chamber 20, beveled edges 35 near the lower edge 37 for fitting within and resting on the frusto-conical lower portion 11ᵃ of the chamber, and converging edges 38 fitting within and spot-welded at 39 to the underside of the trap cone. It will be seen in FIGS. 2 and 4 that the side edges 34 are spaced apart approximately the same distance as the diameter of the underflow chamber 21 and the baffle plate thus divides the chamber longitudinally in half (see FIG. 4), the circular edge 30 being spaced inwardly from each side edge by the width of the gap. With this arrangement, the baffle plate 32 supports and properly positions the conical portion of the trap unit within the chamber with the circular edge 30 generally concentric with the chamber wall.

In operation of the hydrocyclone 10, the swirling mixture of fluid and solid particles passing through the outlet opening 15 and the outlet cone 18 continues to swirl about the upper end of the trap unit 28 as the concentrated solids begin to settle out onto and around the conical wall of the trap. The wall, however, has little, if any, effect on the normal separating function of the hydrocyclone. As the particles settle, the gravitate and are washed along the wall to the gap and pass through the latter to the substantially enclosed portion beyond the trap cone. Because of the swirl, there is a tendency for fluid to continue flowing around the periphery of the chamber beyond the cone. The baffle 32, however, effectively breaks the swirl beyond the cone and confines the liquid to the section of the chamber which it has entered. Thus, turbulence in the chamber beyond the cone is minimized for reduced disturbance of the settling solids and correspondingly reduced tendency for re-entrainment of the solids in the flow of fluid above the trap cone.

The present invention is believed to be particularly important in hydrocyclones in which the dimensions of the treating chamber 14, the inlet pressure and the outlet size cooperate to drive the main fluid vortex downwardly through and beyond the outlet so that the flow of clean fluid begins well below the outlet opening 15. It has been found that the trap unit 28 significantly increases the separating efficiency of the hydrocyclone, and enables the hydrocyclone to remove greater numbers of particles in the very small size ranges (e.g., down to 1.5 microns) than was possible without the trap. It is believed that this is due, as previously suggested, to the isolation of such particles from the swirling fluid in the underflow chamber 20 more rapidly and completely than has been possible in the past.

I claim as my invention:

1. In combination with a hydrocyclone for separating particles from fluid and having a conical treating chamber, an outlet opening at the smaller end of said chamber, means for directing fluid under pressure into the larger end of said chamber and creating a vortical flow of fluid toward and through said outlet opening and a counterflow of clean fluid toward said larger end, said chamber having an outlet adjacent said larger end for the clean fluid, an outlet cone in inverted relation with said conical chamber beyond said outlet opening, and an underflow chamber having a peripheral wall of circular cross-section beyond said outlet cone for receiving the particles and accompanying swirling fluid, the improvement comprising, a conical trap member in said underflow chamber adjacent said outlet cone and having a peak generally centered on said outlet cone, said member having a conical wall inclined away from said peak and said outlet cone toward said peripheral wall and a circular peripheral edge on said conical wall spaced a preselected distance from said peripheral wall to cooperate with the latter in defining an encircling gap around said edge for the passage of particles and fluid from said outlet cone into said underflow chamber, and a baffle plate extending generally along the axes of said trap member and said underflow chamber on the side of the trap member remote from said outlet cone, said baffle plate having side edges disposed substantially against said peripheral wall to break swirling of liquid along said peripheral wall beyond said gap.

2. The combination defined in claim 1 in which said peak is disposed within said outlet cone to define an annular outlet therefrom.

3. The combination defined in claim 1 in which said conical wall and said baffle plate are joined together in a one-piece unit, said plate having edge surfaces abutting against said peripheral wall to position said unit in the underflow chamber with said peripheral edge spaced said preselected distance from said peripheral wall, the spacing between said edge surfaces being greater than the diameter of said peripheral edge.

4. In combination with a hydrocyclone for separating particles from fluid and having a conical treating chamber, inlet means adjacent the larger end of said chamber for directing fluid under pressure into the chamber and creating a vortical flow of fluid toward the smaller end of the chamber and a counterflow of clean liquid toward said larger end, said chamber having an outlet adjacent said larger end for the clean fluid, an outlet at said smaller end for the passage of particles from the chamber together with swirling fluid, and an underflow chamber having an entry end beyond said outlet for receiving the particles and swirling fluid, the improvement comprising, a trap unit in said underflow chamber enhancing final separation of the particles from the fluid in the underflow chamber, said trap unit extending across said underflow chamber adjacent said outlet opening and having a peripheral edge extending around the peripheral wall of said underflow chamber and cooperating therewith to define a peripheral gap for the passage of particles and fluid from said outlet to the underflow chamber only along said wall, a raised central portion disposed between said outlet and said peripheral edge and having at least a part thereof disposed within said outlet opening, and an inclined surface between said raised portion and said peripheral edge for movement of particles along said inclined surface to said gap and thence along said wall into said underflow chamber.

5. The combination defined in claim 4 in which said underflow chamber is circular in cross-section and said surface is generally conical, having a peak centered on said outlet to form said raised portion and a circular peripheral edge generally concentric with and spaced inwardly from said wall.

6. The combination defined in claim 5 further including a baffle plate on said trap unit extending away from said outlet and dividing said underflow chamber, beyond said gap, generally in half, said baffle plate having side edges closely adjacent said wall thereby to prevent swirling of said liquid along and around said wall beyond said gap.

References Cited

UNITED STATES PATENTS

| | | | |
|---|---|---|---|
| 2,010,435 | 8/1935 | Matheson | 210—512 X |
| 3,235,090 | 2/1966 | Bose et al. | 210—512 |

JAMES L. DE CESARE, Primary Examiner

U.S. Cl. X.R.

209—211